3,721,723
STORABLE PHOTOSENSITIZED POLYESTER MOLDING AND COATING COMPOSITIONS
Klaus Heidel, Marl, Germany, assignor to Chemische Werke Huls Aktiengesellschaft, Marl, Germany
No Drawing. Filed Sept. 10, 1970, Ser. No. 71,277
Claims priority, application Germany, Sept. 10, 1968, P 19 45 725.1
Int. Cl. C08f 1/00, 21/00
U.S. Cl. 260—865       12 Claims

ABSTRACT OF THE DISCLOSURE

The storage stability in the dark of polyester prepolymer compositions curable by ultraviolet radiation by the presence therein of a benzoin photosensitizer is improved by incorporating an organophosphite therein.

BACKGROUND OF THE INVENTION

This invention relates to storable photosensitized polyester molding and coating compositions.

It is known that polymerizable polyester prepolymer molding and coating compositions, called "molding compositions" hereinbelow, consisting of unsaturated polyesters and monomeric compounds incorporable therein by polymerization, which contain minor amounts of photosensitizers, can be cured by UV radiation. Examples of compounds which have been described as photosensitizers for photochemical curing are:

(1) diaryl sulfides (German published application DAS 1,233,594);
(2) deoxybenzoin and the derivatives thereof (U.S. Pat. 2,641,576);
(3) benzoin and the ethers thereof with primary or secondary alcohols (Dutch published application 6806318).

The usefulness of these sensitizers is determined, on the one hand, by their photochemical effectiveness in the presence of ultraviolet light, and, on the other hand, by the shelf life in the dark of the sensitized molding compositions. The compounds listed under (1) sensitize curing under UV radiation relatively weakly. Their advantage resides in that the compositions do not discolor and exhibit a relatively long shelf life in the dark.

The compounds under (2) have a photosensitizing effect which, in some cases, is equal to and, in other cases, somewhat better than the diaryl sulfides. However, the shelf stability in the dark of the molding compositions photosensitized with these compounds is substantially poorer.

Finally, benzoin, set forth in (3), has relatively high photosensitizing activity. One disadvantage of its use is the poor shelf stability of the thus-sensitized molding compositions in the dark. Benzoin alkyl ethers are more effective than benzoin and the thus-sensitized molding compositions have better storage stability in the dark.

Dutch patent application 6806318 discloses that a shelf stability of about 5-7 days at 60° C. can be obtained by the choice of suitable benzoin ethers, viz., benzoin ethers of secondary alcohols. This shelf life is insufficient since such temperatures can occur in cases of careless storage or during shipment to tropical countries. As a result, sensitizer-containing molding compositions can gel prematurely.

In order to increase the storage stability of such photosensitized molding compositions, stabilizers are therefore employed in addition to the photosensitizer.

In German published application DAS 1,233,594, column 2, sixth paragraph, lines 47–53, and in the published text of Dutch patent application 6806318, page 4, lines 11–15, phenolic or quinonoid stabilizers and also copper compounds are used to increase the shelf stability of such photosensitized molding compositions. However, these substances improve the storability of sensitized molding compositions only slightly, as demonstrated by comparative tests and, on the other hand, interfere considerably with the curing process. This manifests itself, for example, in the fact that the drying of varnish films is considerably delayed.

OBJECTS OF THE INVENTION

It is therefore an object of this invention to provide novel photosensitized polyester prepolymer compositions having improved stability in the dark. It is another object to provide such prepolymer compositions which have fewer disadvantages than the stabilized photosensitized polyester prepolymers of the prior art. It is a further object to provide a novel process for improving the storage stability in the dark of photosensitized polyester prepolymers. Other objects will be apparent to those skilled in the art to which this invention pertains.

SUMMARY OF THE INVENTION

According to this invention, polyester prepolymers photosensitized by a benzoin photosensitizer are rendered more storage stable by a small percentage of an organophosphite.

The molding compositions of this invention exhibit the advantage of high photosensitivity with a substantially increased shelf stability than conventional benzoin photosensitized polyester prepolymers. Accordingly, they satisfy the technical and practical requirements of such photosensitized compositions to a substantially greater extent.

DETAILED DISCUSSION

The conventional polyester prepolymers employed in the compositions of this invention contain (A) one or more resinous, ethylenically unsaturated polymerizable polyester, prepolymer, and
(B) at least one monomeric, ethylenically unsaturated compound incorporable into the polyester by polymerization therewith.

Such prepolymers can, optionally, also contain conventional auxiliary agents, such as, for example, initiators, accelerators, antioxidants, inhibitors, stabilizers, etc.

Unsaturated polymerizable polyester prepolymers can be produced by the melt or azeotropic condensation of (a) at least one $\alpha,\beta$-unsaturated dicarboxylic acid or the anhydride thereof, and
(b) at least one dihydric alcohol.

Optionally, up to 80 molar percent of the unsaturated acid can be replaced by other types of acids.

The $\alpha,\beta$-unsaturated dicarboxylic acid reactants are the unsaturated acids and anhydrides conventionally used to produce polyester prepolymers. Preferred are the aliphatic dicarboxylic acids and their anhydrides, e.g., those containing 4 carbon atoms.

The dihydric alcohol reactant consists of one or more glycols conventionally used in the production of polyesters. Ordinarily, alkane diols which contain 2 to 10 and preferably 2 to 6 carbon atoms are employed. A mixture of two or more of such glycols can be employed.

Specific examples of such $\alpha,\beta$-unsaturated acids and anhydrides are maleic acid and maleic anhydride, fumaric acid and itaconic acid.

Specific examples of the dihydric alcohols which can be employed are ethylene glycol, diethylene glycol, propylene glycol, butylene glycol, 1,4-cyclohexanedimethanol, tricyclodecanedimethanol, tri- or tetraethylene glycol, and glycerin- or trimethylolpropane monoallyl ether.

Specific examples of other acids which optionally can be incorporated into the reaction mass are o-, m-, or p-phthalic acid, tetrahydrophthalic acid, hexahydrophthalic acid, succinic acid, and adipic acid.

The molar ratio of the acids employed to the alcohols generally is between 0.8:1 and 1.1:1, preferably between 0.90:1 and 1.05:1.

The unsaturated polyesters are polymerized according to conventional procedures to an acid number of generally about 10 to 50, preferably 15 to 40.

Suitable monomeric, ethylenically unsaturated compounds (B) incorporable by polymerization into the polyester molecule are those customarily used in polyester molding compositions, e.g., aromatic hydrocarbons containing 8 to 10 carbon atoms, having a side chain containing an activated ethylenic double bond; alkyl esters of $\alpha,\beta$-unsaturated aliphatic acids wherein the alkyl group contains 1 to 4, preferably 1 to 2, carbon atoms and the acid portion contains 3 to 4 carbon atoms; and esters and ethers of unsaturated alcohols containing an activated ethylenic double bond and 2 to 4, preferably 2 to 3, carbon atoms. Such monomers include styrene, which is preferred, and o-, m-, p- and $\alpha$-methylstyrene, the acrylates, e.g., methyl and ethyl acrylate, and methacrylates, e.g., methyl methacrylate and other esters of acrylic and methacrylic acid, esters and ethers of vinyl and allyl alcohol, e.g., vinyl acetate, diallyl phthalate and glycerin triallyl ethers.

The molding compositions contain the monomer or monomers which are incorporated into the polyester molecule by polymerization in amounts of 10-80% by weight, preferably about 25-60% by weight.

The photosensitized polyester prepolymer compositions contain a benzoin photosensitizer, e.g., benzoin and nuclear-substituted benzoins, benzoins substituted in the $\alpha$-position, and alkyl ethers of each of these benzoins, e.g., wherein the alkyl group contains 1–8 carbon atoms.

Examples of such photosensitizers are benzoin, benzoin alkyl ethers, e.g., wherein the alkyl residue of which contains 1–8 carbon atoms, e.g., benzoin methyl ether, benzoin ethyl ether, benzoin isopropyl ether, benzoin sec.-butyl ether, benzoin octyl ether, benzoin cyclohexyl ether, nuclear-substituted benzoins, such as anisoin, p,p'-dimethylbenzoin (p-toluoin) or o,o'-dichlorobenzoin, or the alkyl ethers thereof, benzoins substituted in the $\alpha$-position, such as, for example, $\alpha$-methylbenzoin, $\alpha$-allylbenzoin, $\alpha$-phenylbenzoin and $\alpha$-benzylbenzoin and the alkyl ethers thereof, e.g., wherein the alkyl residue of which contains 1–8 carbon atoms. Such photosensitizers are employed in the polyester molding compositions in amounts usually of about 0.1 to about 5% by weight, preferably about 0.5 to 2% by weight.

The photosensitized polyester prepolymer compositions are stabilized by incorporating therein an organophosphite which contains at least one aryl group. The aryl group can, for example, contain 1–3 fused or separate rings and a total of 6 to 14 ring carbon atoms. The rings can be substituted with, e.g., one or more alkyl groups which can, for example, contain 1 to 14 carbon atoms, halogen atoms, e.g., chlorine, bromine and fluorine, or other conventional ring substituents. Preferably, the phosphite contains at least two and more preferably three aryl groups. Examples of such phosphites are triphenyl phosphite, tritoluyl phosphite, trinaphthyl phosphite, tris(nonylphenyl) phosphite, diphenylisooctyl phosphite, diphenylisodecyl phosphite, diphenyltetrahydrofurfuryl phosphite, bis(diphenyl phosphite) of bisphenol A (p,p'-isopropylidene diphenol), diphenyl-n-butyl phosphite, as well as tris(chlorophenyl) phosphite and didecylphenyl phosphite. Triphenyl phosphite and tris(nonylphenyl) phosphite are preferred.

The phosphites are employed in the molding compositions usually in amounts of about 0.01 to 2% by weight, preferably about 0.1 to 0.5% by weight.

The stabilized photosensitized polyester molding compositions of this invention optionally can contain minor amounts of conventional polymerization inhibitors, for example, hydroquinone, toluhydroquinone, 2,5-di-tert.-butylhydroquinone, tert.-butylcatechol, or 2,5-di-tert.-butylbenzoquinone. These inhibitors can be added prior to or after the production of the polyester prepolymer, for example before the onset of esterification, but usually prior to adding the monomer to be incorporated into the polyester molecule by polymerization, especially when the monomer is styrene, in order to prevent premature undesired gelling.

Although these conventional polymerization inhibitors are usually required in the production of the sensitizer-free molding compositions, they interfere with the curing of the photosensitized compositions. Therefore the amount of such additives should be as small as possible, e.g., about 0.005 to 0.05% by weight.

Other conventional auxiliary agents which can be added to the photosensitized polyester molding compositions include paraffins and waxes, to exclude the polymerization-inhibiting influence of the air; peroxides, such as, for example, dicumyl peroxide, benzoyl peroxide, methyl ethyl ketone peroxide, or cyclohexanone peroxide, especially together with conventional accelerators, e.g., cobalt or vanadium salts, or tertiary amines for accelerating the curing process; UV-absorbents, e.g., salicylic acid esters, hydroxybenzophenones, or hydroxyaryl benzotriazoles for the light-stabilization of cured shaped articles or films; and pigments and/or mineral fillers.

The photosensitized molding compositions are cured by ultraviolet rays. Suitable sources of UV radiation are, in addition to sunlight, preferably mercury, tungsten, and xenon lamps, which radiate in the wavelength range of from 2,500 to about 4,500 A.

Experiments in which triphenyl phosphite or tris(nonylphenyl) phosphite is employed as the stabiilzer demonstrate that the shelf stability of the molding compositions is substantially improved and the film hardness, which represents a yardstick for the hardening, is not impaired. When employing phenolic and quinonoid inhibitors, the film hardness was greatly impaired. Although copper salts did not impair the film hardness, they did not improve the shelf stability.

The use of an organophosphite as the stabilizer in combination with a benzoin photosensitizer according to this invention, provides novel photosensitive molding compositions which are distinguished by a good storage stability in the dark and good light sensitivity.

The molding compositions of this invention are suitable for varnishing, coating of wood, particularly wood fiber boards, metals, stone, or synthetic materials. They can also be employed for the production of shaped articles, e.g., glass-fiber-reinforced, and putty mass.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES

Polyester Resin A 650 parts by weight of an unsaturated polyester produced by conventional esterification of fumaric acid, phthalic anhydride, propylene glycol, and diethylene glycol in a molar ratio of 1.5:1:1.2:1.3, up to an acid number of 32, is mixed with 0.2 part by weight of hydroquinone and dissolved in 350 parts by weight of styrene.

Polyester Resin B 670 parts by weight of an unsaturated polyester produced by melt condensation of fumaric acid, phthalic anhydride, and 1,2-propane-diol in a molar ratio of 1:1:2.1, up to an acid number of 38, is mixed with 0.2 part by weight of hydroquinone and dissolved in 330 parts by weight of styrene.

Samples of the polyester resin solutions of 100 g. each were mixed with the amounts of photosensitizer, a phosphite according to the invention, or a prior art inhibitor, as set forth in the tables below.

The thus-obtained polyester coating compositions are drawn down on glass plates with a film draw-down square (200μ) and UV-irradiated on a water-cooled cooling plate with a 580 watt high-pressure mercury vapor lamp for the periods of time set forth in the tables below. The hardness of the films is measured after a storage time of 24 hours at room temperature, by means of the pendulum device according to König (German Industrial Standard DIN 53,157). The remainder of the solution is stored in sealed test tubes at 50° C. in the dark until the onset of gelling.

Equally good results as set forth in Tables I and II are obtained by incorporating in the polyester molding compositions described herein the other phosphites described above, together with benzoin or other benzoin photosensitizer, in the ratios set forth herein.

tions of the invention to adapt it to various usages and conditions.

What is claimed is:

1. A storable photosensitized molding or coating composition comprising a mixture of (a) an ethylenically unsaturated polymerizable polyester prepolymer having an acid number of about 10 to 50 and which is a reaction product of an unsaturated aliphatic dicarboxylic acid or anhydride and an alkane diol of 2 to 10 carbon atoms in a molar ratio of acid to alcohol of between 0.8:1 and 1.1:1; (b) 10–80% by weight of the composition of a monomeric ethylenically unsaturated compound incorporable into the polyester prepolymer by polymerization therewith selected from the group consisting of aromatic hydrocarbons of 8 to 10 carbon atoms having a side chain containing an activated ethylenic double bond, alkyl esters of α,β-unsaturated aliphatic acid wherein alkyl is of 1 to 4 carbon atoms and the acid is of 3 to 4 carbon atoms, and esters and ethers of unsaturated alcohols of 2 to 4 carbon atoms containing an activated ethylenic double bond; (c) a photosensitizing amount from 0.1 to 5% by weight of the composition of a ben-

TABLE I

| Resin | Experiment No. | Sensitizer | Parts by wt. | Inhibitor | Parts by wt. | Film hardness (sec.) after an irradiation period of— | | | | Storability (days) of the sensitized resins in the dark at 50° C. |
|---|---|---|---|---|---|---|---|---|---|---|
| | | | | | | 2 min. | 5 min. | 10 min. | 15 min. | |
| A | 1 | Benzoin ethyl ether | 2 | | | 98 | 140 | 157 | 168 | 5 |
| A | 2 | do | 2 | Triphenyl phosphite | 0.2 | 102 | 141 | 155 | 168 | 10 |
| A | 3 | do | 2 | do | 0.5 | 110 | 138 | 162 | 170 | 11 |
| A | 4 | Benzoin isopropyl ether | 2 | | | 103 | 132 | | 158 | 8 |
| A | 5 | do | 2 | Triphenyl phosphite | 0.2 | 110 | 135 | | 169 | 23 |
| A | 6 | do | 2 | do | 0.5 | 114 | 136 | | 172 | 16 |
| A | 7 | Benzoin methyl ether | 2 | | | 115 | 140 | 156 | 168 | 3 |
| A | 8 | do | 2 | Tris(nonylphenyl) phosphite | 0.5 | 117 | 138 | 157 | 165 | 8 |
| A | 9 | Benzoin isopropyl ether | 2 | | | 98 | 129 | | 151 | 7 |
| A | 10 | do | 2 | Tris(nonylphenyl) phosphite | 0.2 | 99 | 128 | | 148 | 14 |
| A | 11 | do | 2 | do | 0.5 | 98 | 128 | | 150 | 23 |
| A | 12 | do | 2 | Diphenyl isooctyl phosphite | 0.2 | 101 | 134 | | 162 | 13 |
| A | 13 | do | 2 | do | 0.5 | 99 | 135 | | 153 | 16 |

TABLE II

| Resin | Experiment No. | Sensitizer | Parts by wt. | Inhibitor | Parts by wt. | Film hardness (sec.) after an irradiation period of— | | | | Storability (days) of the sensitized resins in the dark at 50° C. |
|---|---|---|---|---|---|---|---|---|---|---|
| | | | | | | 2 min. | 5 min. | 10 min. | 15 min. | |
| B | 1 | Benzoin ethyl ether | 2 | | | 124 | | | 197 | 6 |
| B | 2 | do | 2 | Triphenyl phosphite | 0.2 | 128 | | | 203 | 16 |
| B | 3 | do | 2 | do | 0.5 | 132 | | | 198 | 17 |
| B | 4 | do | 2 | do | 1.0 | 124 | | | 195 | 17 |
| B | 5 | do | 2 | | | 121 | 161 | | 200 | 6 |
| B | 6 | do | 2 | Didecylphenyl phosphite | 0.2 | 121 | 160 | | 201 | 10 |
| B | 7 | do | 2 | do | 0.5 | 120 | 160 | | 195 | 14 |
| B | 8 | do | 2 | Decyldiphenyl phosphite | 0.2 | 120 | 148 | | 202 | 15 |
| B | 9 | do | 2 | do | 0.5 | 118 | 157 | | 202 | 20 |

TABLE III

Comparative Experiments

| Resin | Experiment No. | Sensitizer | Parts by wt. | Inhibitor | Parts by wt. | Film hardness (sec.) after an irradiation period of— | | | | Storability (days) of the sensitized resins in the dark at 50° C. |
|---|---|---|---|---|---|---|---|---|---|---|
| | | | | | | 2 min. | 5 min. | 10 min. | 15 min. | |
| A | 1 | Benzoin ethyl ether | 2 | Hydroquinone | 0.05 | *Tacky | 84 | 92 | 83 | 11 |
| A | 2 | do | 2 | Tert.-butyl catechol | 0.05 | *Tacky | 92 | 94 | 86 | 7 |
| A | 3 | do | 2 | 2,5-di-tert.-butyl hydroquinone | 0.05 | 45 | 68 | 70 | 68 | 7 |
| A | 4 | do | 2 | do | 0.05 | *Tacky | 102 | 112 | 132 | 5 |
| A | 5 | do | 2 | Copper naphthenate | 0.005 | 102 | 140 | 157 | 157 | 4 |

* Too soft, pendulum hardness not measurable.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modificazoin or an alkyl ether thereof; and (d) a stabilizing amount from 0.1 to 2% by weight of the composition of an organophosphite selected from the group consisting of an unsubstituted triaryl phosphite, a triaryl phosphite whose rings are substituted by alkyl of 1 to 14 carbon atoms, chlorine, bromine or fluorine, diphenylisooctyl phosphite, diphenylisodecyl phosphite, diphenyltetrahydrofurfural phosphite, bis(diphenyl phosphite) of p,p'-isopropylidenediphenol, diphenyl-n-butyl phosphite and didecylphenyl phosphite.

2. A photosensitized polyester molding or coating composition according to claim 1 wherein the phosphite contains a phenyl, naphthyl, alkyl-substituted or halogen-substituted phenyl group.

3. A photosensitized polyester molding or coating composition according to claim 1 wherein the phosphite is selected from the group consisting of triphenyl phosphite, tritoluyl phosphite, trinaphthyl phosphite, tris(nonylphenyl) phosphite, diphenylisooctyl phosphite, diphenylisodecyl phosphite, diphenyltetrahydrofurfuryl phosphite, bis(diphenylphosphite) of bisphenol A, diphenyl-n-butyl phosphite, tris(chlorophenyl) phosphite, and didecylphenyl phosphite.

4. A photosensitized polyester molding or coating composition according to claim 3 wherein the phosphite is triphenyl phosphite.

5. A photosensitized polyester molding or coating composition according to claim 3 wherein the phosphite is tris(nonylphenyl) phosphite.

6. A photosensitized polyester molding or coating composition according to claim 1 wherein the photosensitizer is an alkyl ether of benzoin.

7. A photosensitized polyester molding or coating composition according to claim 1 containing 0.1–0.5% by weight of the phosphite stabilizer and 0.5–2% by weight of the benzoin photosensitizer.

8. A process for improving the storage stability of a mixture of (a) an ethylenically unsaturated polymerizable polyester prepolymer having an acid number of about 10 to 50 and which is a reaction product of an unsaturated aliphatic dicarboxylic acid or anhydride and an alkane diol of 2 to 10 carbon atoms in a molar ratio of acid to alcohol of between 0.8:1 and 1.1:1 and (b) 10–80% by weight of the composition of a monomeric ethylenically unsaturated compound incorporable into the polyester prepolymer by polymerization therewith selected from the group consisting of aromatic hydrocarbons of 8 to 10 carbon atoms having a side chain containing an activated ethylenic double bond, alkyl esters of $\alpha,\beta$-unsaturated aliphatic acid wherein alkyl is of 1 to 4 carbon atoms and the acid is of 3 to 4 carbon atoms, and esters and ethers of unsaturated alcohol of 2 to 4 carbon atoms containing an activated ethylenic double bond, photosensitized by from 0.1 to 5% by weight of a benzoin or an alkyl ether thereof, which comprises incorporating therein a stabilizing amount from 0.1% to 2% by weight of an organophosphite selected from the group consisting of an unsubstituted triaryl phosphite, a triaryl phosphite whose rings are substituted by alkyl of 1 to 14 carbon atoms, chlorine, bromine or fluorine, diphenylisooctyl phosphite, diphenylisodecyl phosphite, diphenyltetrahydrofurfural phosphite, bis(diphenyl phosphite) of p,p'-isopropylidenediphenol, diphenol-n-butyl phosphite and didecylphenyl phosphite.

9. A process according to claim 8 wherein the phosphite contains a phenyl, naphthyl, alkyl-substituted or halogen-substituted phenyl group.

10. A process according to claim 8 wherein the phosphite is selected from the group consisting of triphenyl phosphite, tritoluyl phosphite, trinaphthyl phosphite, tris(nonylphenyl) phosphite, diphenylisooctyl phosphite, diphenylisodecyl phosphite, diphenyltetrahydrofurfuryl phosphite, bis(diphenylphosphite) of bisphenol A, diphenyl-n-butyl phosphite, tris(chlorophenyl) phosphite, and didecylphenyl phosphite.

11. A process according to claim 10 wherein the phosphite is triphenyl phosphite.

12. A process according to claim 10 wherein the phosphite is tris(nonylphenyl) phosphite.

References Cited

UNITED STATES PATENTS

| | | | |
|---|---|---|---|
| 3,360,589 | 12/1967 | Raichle et al. | 260—863 |
| 3,582,487 | 6/1971 | Fuhr et al. | 204—159.15 |

FOREIGN PATENTS

| | | | |
|---|---|---|---|
| 1,576 | 9/1962 | Japan | 260—865 |
| 1,098,712 | 2/1961 | Germany | 260—865 |

WILLIAM H. SHORT, Primary Examiner

L. L. Lee, Assistant Examiner

U.S. Cl. X.R.

117—93.31, 126 GR, 132 B, 138.8 A, 148; 204—159.15; 260—28, 40 R, 45.7 R, 45.95, 866

UNITED STATES PATENT OFFICE
CERTIFICATE OF CORRECTION

Patent No. 3,721,723            Dated   March 20, 1973

Inventor(s)   Klaus HEIDEL

It is certified that error appears in the above-identified patent and that said Letters Patent are hereby corrected as shown below:

Column 1, line 7 of the Heading: change "September 10, 1968" to --September 10, 1969--.

Signed and sealed this 14th day of May 1974.

(SEAL)
Attest:

EDWARD M. FLETCHER, JR.
Attesting Officer

C. MARSHALL DANN
Commissioner of Patents